United States Patent
Lok et al.

(10) Patent No.: US 8,536,236 B2
(45) Date of Patent: Sep. 17, 2013

(54) SHAPED EGGSHELL CATALYST CONTAINING COBALT, USE AND PREPARATION THEREOF

(75) Inventors: Cornelis Martinus Lok, Guisborough (GB); Sharon Bale, Stockton on Tees (GB)

(73) Assignee: Johnson Matthey PLC, London (GB)

( * ) Notice: Subject to any disclaimer, the term of this patent is extended or adjusted under 35 U.S.C. 154(b) by 785 days.

(21) Appl. No.: 11/791,769

(22) PCT Filed: Nov. 21, 2005

(86) PCT No.: PCT/GB2005/050206
§ 371 (c)(1),
(2), (4) Date: May 29, 2007

(87) PCT Pub. No.: WO2006/059148
PCT Pub. Date: Jun. 8, 2006

(65) Prior Publication Data
US 2007/0270514 A1 Nov. 22, 2007

(30) Foreign Application Priority Data
Dec. 3, 2004 (GB) .................................. 0426473.5

(51) Int. Cl.
| | |
|---|---|
| *B01J 35/00* | (2006.01) |
| *B01J 21/04* | (2006.01) |
| *B01J 35/02* | (2006.01) |
| *B01J 37/02* | (2006.01) |
| *B01J 23/75* | (2006.01) |
| *B01J 21/08* | (2006.01) |
| *C07C 45/00* | (2006.01) |
| *C07C 5/00* | (2006.01) |
| *C07C 5/03* | (2006.01) |

(52) U.S. Cl.
USPC ........... 518/715; 502/174; 502/260; 502/162; 502/167; 568/881; 568/950; 568/399

(58) Field of Classification Search
USPC ........................................... 502/415
See application file for complete search history.

(56) References Cited

U.S. PATENT DOCUMENTS

5,733,839 A * 3/1998 Espinoza et al. ............... 502/336
5,874,381 A * 2/1999 Bonne et al. ................... 502/327

(Continued)

FOREIGN PATENT DOCUMENTS

| WO | 2003/024905 A | 3/2003 |
| WO | 2004/028687 A | 4/2004 |
| WO | 2005/107942 A | 11/2005 |

OTHER PUBLICATIONS

Iglesia et al, Topics in Catalysis 2, 1995, 17-27.*

(Continued)

*Primary Examiner* — Yun Qian
(74) *Attorney, Agent, or Firm* — Jones Day

(57) ABSTRACT

A method for the preparation of an eggshell catalyst is described comprising the steps of i) immersing shaped units of an oxidic support having a smallest unit dimension $\geq 0.5$ mm in a solution of cobalt ammine carbonate, ii) heating the solution to a temperature between 60 and 120° C. to precipitate cobalt compounds onto the surface of the shaped units, iii) separating the resulting supported cobalt compounds from the remaining solution, and iv) drying the supported cobalt compounds. The cobalt compounds may be reduced to provide catalysts suitable for the hydrogenation of unsaturated compounds or the Fischer-Tropsch synthesis of hydrocarbons.

12 Claims, 1 Drawing Sheet

(56) References Cited

U.S. PATENT DOCUMENTS

| | | |
|---|---|---|
| 6,346,137 B1 * | 2/2002 | Hohne et al. .................. 75/374 |
| 6,927,190 B2 * | 8/2005 | Lok et al. ..................... 502/327 |
| 7,351,679 B2 * | 4/2008 | Eri et al. ...................... 502/327 |
| 2003/0032684 A1 | 2/2003 | Lok et al. |
| 2003/0119668 A1 | 6/2003 | Lok et al. |
| 2004/0077737 A1 * | 4/2004 | Eri et al. ...................... 518/717 |

OTHER PUBLICATIONS

Internation Search Report dated Jan. 27, 2006 for PCT/GB2005/050203.

* cited by examiner

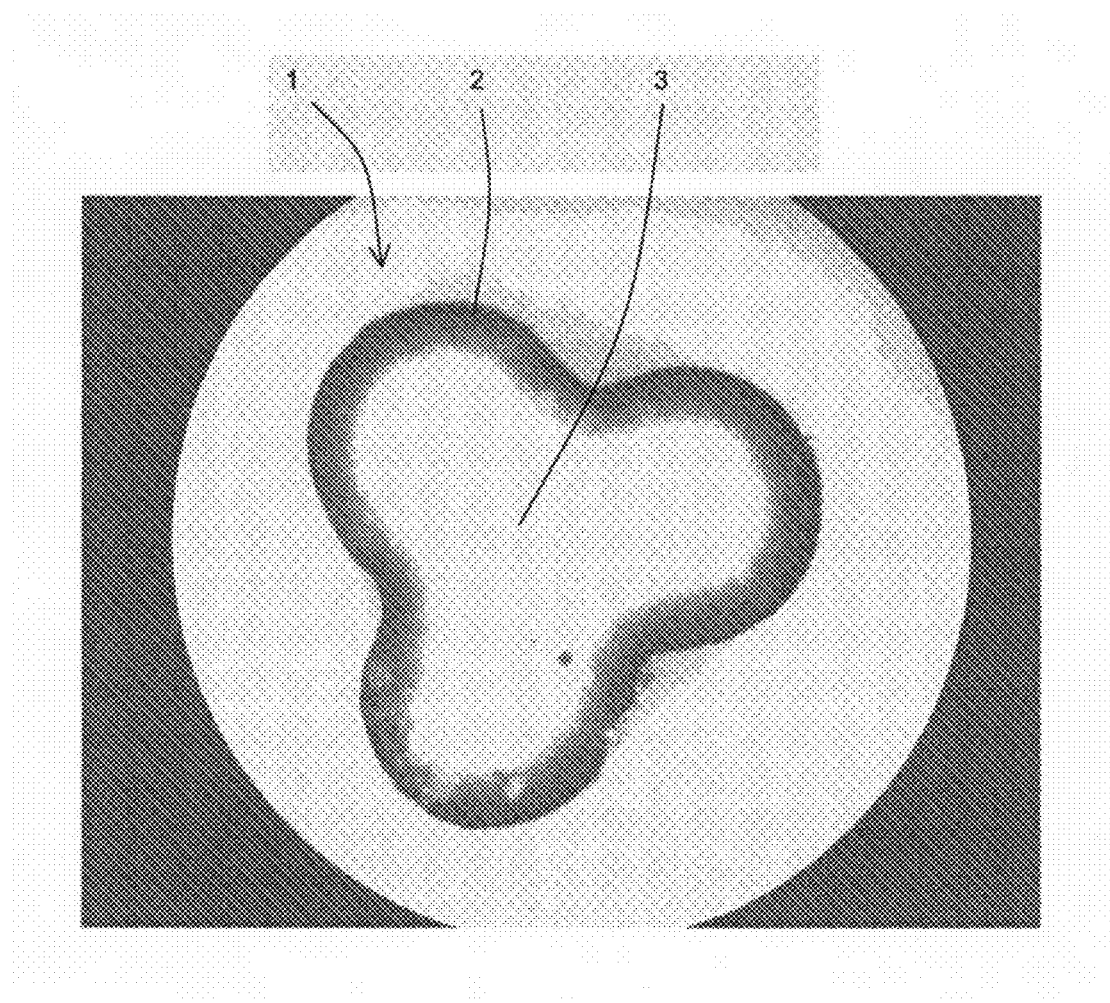

SHAPED EGGSHELL CATALYST CONTAINING COBALT, USE AND PREPARATION THEREOF

CROSS REFERENCE TO RELATED APPLICATION

This application is the National Phase application of International Application No. PCT/GB2005/050206, filed Nov. 21, 2005, which designates the United States and was published in English. This application, in its entirety, is incorporated herein by reference.

The application relates to a method for preparing supported cobalt catalysts and in particular for the preparation of so-called eggshell cobalt catalysts.

Eggshell catalysts may be described as supported catalysts where the active component or its precursor is provided principally as a thin outer layer on the surface of the support, as opposed to being dispersed evenly within the support. Compared with catalysts that have the active metal dispersed throughout the support, shell catalysts have a short diffusion length and are low in diffusion limitation. In the Fischer-Tropsch synthesis of hydrocarbons, this can lead to a desirable increased selectivity with respect to the formation of C5+ hydrocarbons and the suppression of methane formation. However in order to provide catalysts with sufficient productivity it is desirable to have a high concentration of catalytically active metal in the surface layer.

For example, U.S. Pat. No. 5,545,674 describes the preparation of shell catalysts by repeated impregnation of a solution of cobalt, particularly cobalt nitrate, into a particulate support using an immersion or spraying method with intermediate drying and calcining steps. Such methods are cumbersome and time consuming and with multiple impregnation methods some of the metal may penetrate into the support beyond the desired outer layer. Hence alternative methods for preparing shell catalysts that do not require spraying or multiple impregnations are desired.

WO 02/07882 describes the preparation of an eggshell catalyst or a precursor thereto by applying a slurry of fine particles of solid catalyst or precursor thereto, optionally containing a refractory oxide, onto the surface of a core carrier support and drying. This method has the disadvantage that the use of a slurry of catalyst or catalyst precursor presents difficulties in handling and in applying the slurry evenly to the core carrier.

We have found that an alternative method where the cobalt source is a cobalt ammine carbonate solution is particularly suitable for preparing eggshell cobalt catalysts.

Methods for preparing alumina-, silica- and titania-supported catalysts using cobalt ammine carbonate solutions are described in U.S Pat. No. 5,874,381, WO 01/62381, WO 01/87480 and WO 04/28687.

In U.S. Pat. No. 5,874,381, theta alumina extrudates were subjected to impregnation by immersing them in a cobalt ammine carbonate solution for 10 minutes, filtering off the solution and drying at 120° C. The method was repeated a further three times to increase the cobalt content and in each case the dried precursors were calcined at 350° C.

In WO 01/87480, a gamma alumina powder, having a surface-weighted mean diameter D[3,2] of 2.08 microns, was slurried with cobalt ammine carbonate and heated to 96° C to form a catalyst precursor that was filtered and dried at 120° C. A comparative example was prepared using 1.2×1.3 mm tri-lobal gamma alumina extrudates according to the multiple impregnation method of the aforesaid U.S. Pat. No. 5,874,381. Tests showed the impregnated extrudates to be less active in the Fischer-Tropsch synthesis of hydrocarbons than the powder-supported catalysts.

In WO 01/62381, 1 mm and 2 mm diameter silica extrudates were subjected to impregnation by immersing them in a cobalt ammine carbonate solution for 2 minutes, filtering off the solution and drying at 150° C. The impregnation was repeated a further four times to increase the cobalt content and in each case the dried precursors were calcined at 280° C. Alternatively, a silica powder, having a surface-weighted mean diameter D[3,2] of 66 microns was impregnated using this method and also by slurrying it in cobalt ammine carbonate solution and heating to 100° C. to form a catalyst precursor that was filtered, dried at 150° C. and calcined at 400° C.

In WO 04/028687, catalysts were prepared using a titania powder, having a surface-weighted mean diameter D[3,2] of 1.7 microns, which was slurried with cobalt ammine carbonate and heated to 96° C. to form a catalyst precursor, filtered and dried at 110° C. Titania-coated alumina powders were also impregnated in a similar way.

In each case above, where the support particles were extrudates, the multiple impregnation route was employed wherein the excess cobalt solution was separated from the shaped units before heating to decompose the cobalt ammine carbonate. The multiple impregnation method is unsuitable for the preparation of eggshell catalysts for the reasons given above. However, it is desirable in some processes, particularly slurry-phase processes, to use larger support materials to improve the recovery of the catalysts and thereby improve productivity. Therefore there is a desire to provide an alternative method for the formation of cobalt catalysts or precursors thereto as a thin outer layer on support materials having a particle size of 0.5 mm and above.

Accordingly, the present invention provides a method for the preparation of an eggshell catalyst comprising the steps of
i) immersing shaped units of an oxidic support having a smallest unit dimension $\geq$0.5 mm in a solution of cobalt ammine carbonate,
ii) heating the solution to a temperature between 60 and 120° C. to precipitate cobalt compounds onto the surface of the shaped units,
iii) separating the resulting supported cobalt compounds from the remaining solution, and
iv) drying the supported cobalt compounds.

The invention may further comprise, (v) optionally, heating the supported cobalt compounds to at least partially convert them to cobalt oxide, and/or vi) heating the supported cobalt compounds under reducing conditions to so that at least part of the cobalt is converted to its elemental form.

The invention further provides catalysts obtainable by the above method and the use of such catalysts for performing hydrogenation reactions and the Fischer-Tropsch synthesis of hydrocarbons.

The cobalt ammine carbonate is most preferably formed by dissolving basic cobalt carbonate in an aqueous solution of ammonium carbonate containing additional ammonium hydroxide. The relative amounts of the three components are preferably such that the pH of the solution is in the range 7.5 to 12, more preferably 9 to 12. The solution preferably contains 0.1 to 2.5 moles of the cobalt complex per liter. Preferably, the cobalt concentration of the solution is greater than 2.5% wt, more preferably greater than 5% wt. As the concentration of cobalt increases, then preferably the proportion of carbonate ions relative to hydroxide ions in the basic cobalt carbonate feed should be increased. Preferably the cobalt in solution is Co(III). Co(III) may be formed from Co(II) in solution by air, chemical or electrical oxidation. In a preferred embodiment, an oxidising agent, such as a peroxide, particularly hydrogen peroxide, is used to convert any Co(II) to Co(III). Whereas the oxidising agent may be added to the cobalt ammine carbonate solution after it has been combined with the shaped oxidic support, preferably the oxidising agent is mixed with the cobalt ammine carbonate solution before combining it with the shaped oxidic support.

If desired, the cobalt ammine carbonate solution may be filtered using known methods before combining it with the shaped oxidic support.

The oxidic support may comprise alumina, silica, aluminosilicate, titania, zirconia or other suitable oxidic support material. Preferably, the oxidic support comprises silica, alumina or titania. The support is in the form of shaped units such as extrudates, pellets or granules, which are typically prepared from powdered support material and which may also comprise lubricants or binders. Extrudates are preferred supports. The extrudates, pellets or granules may be commercially available or are readily prepared from suitable powders using methods known to those skilled in the art.

Shaped units may have a variety of shapes and particle sizes, depending upon the mould or die used in their manufacture. For example the units may be in the form of spheres, cylinders, rings, or multi-holed units, which may be multi-lobed or fluted, e.g. of cloverleaf cross-section. The extrudates or pellets may be spheres or cylindrical, i.e. circular in cross-section, but are preferably lobed or fluted to increase their geometric surface area without increasing the pressure drop through a layer formed from the units. This has the advantage that the units are more readily filterable when used as hydrogenation or Fischer-Tropsch catalysts. Trilobal and tetralobal shaped units are particularly preferred.

The shaped units have a smallest unit dimension >0.5 mm, preferably in the range 1 mm to 50 mm. The smallest dimension may be width, e.g. diameter or length, e.g. height. The shaped units may have a length from 0.5 mm to 50 mm, preferably $\leq$25 mm. The cross sectional width or diameter of the shaped units may be from 0.5 mm to about 25 mm, preferably from 1 mm to 10 mm, particularly from 1 mm to 5 mm. The aspect ratio, i.e. the largest dimension divided by the smallest dimension e.g. length/cross-section, is preferably less than 10. The use of shaped units with these dimensions is advantageous for catalyst recovery and recycle.

Silica supports may be formed from natural sources, e.g. as kieselguhr, may be a pyrogenic or fumed silica or may be a synthetic, e.g. precipitated silica. Precipitated silicas are preferred. The BET surface area of the silica is generally in the range 10-500 $m^2$/g, preferably 100-400 $m^2g^{-1}$. The pore volume is generally between about 0.1 and 4 ml/g, preferably 0.2-2 ml/g and the mean pore diameter is preferably in the range from <2 to about 30 nm. Alternatively the silica may be in the form of a coating on alumina.

Titania supports may be a synthetic, e.g. precipitated titania. The titania may optionally comprise up to 20% by weight of another refractory oxide material, typically silica, alumina or zirconia. The titania may alternatively be present as a coating on a shaped support which is preferably of silica or alumina, typically as a coating of 0.5 to 5 monolayers of titania upon the underlying support. Therefore when we refer to titania we include titania-coated supports. Conventional titania supports suitable for Fischer-Tropsch catalysts are based upon rutile forms of titania, which has superior attrition resistance compared with anatase forms. The BET surface area is generally in the range 10-500 $m^2$/g, preferably 100 to 400 $m^2$/g. The pore volume of the titania is generally between about 0.1 and 4 ml/g, preferably 0.2 to 2 ml/g and the mean pore diameter is preferably in the range from 2 to about 30 nm.

Alternatively the oxidic support may be a zirconia, or more preferably a zirconia-coated silica or alumina, e.g. as a coating of 0.5 to 5 monolayers of zirconia upon the underlying support. Therefore when we refer to zirconia we include zirconia-coated supports.

Preferably the oxidic support comprises alumina. Alumina-supported cobalt catalysts present some distinct advantages over other supported cobalt catalysts. Firstly, cobalt-alumina catalysts are often easier to shape by extrusion than a cobalt-silica or cobalt titania catalysts and the mechanical strength of the resulting catalyst is often higher. Secondly, the metal-support interaction is greater with cobalt-alumina catalysts than with cobalt silica or cobalt-titania catalysts and metal-support interaction is believed to play an important role in achieving stable cobalt dispersion and hence stable high cobalt surface areas. Thirdly, in reactions where water is present, silica can be unstable. Alumina is more stable under such conditions. The oxidic support material preferably comprises a transition alumina. Transition aluminas are defined in "Ullmans Encyklopaedie der technischen Chemie", 4., neubearbeitete und erweiterte Auflage, Band 7 (1974), pp.298-299. Suitable transition alumina may be of the gamma-alumina group, for example eta-alumina or chi-alumina. These materials may be formed by calcination of aluminium hydroxides at 400 to 750° C. and generally have a BET surface area in the range 150 to 400 $m^2$/g. Alternatively, the transition alumina may be of the delta-alumina group which includes the high temperature forms such as delta- and theta-aluminas which may be formed by heating a gamma group alumina to a temperature above about 800° C. The delta-group aluminas generally have a BET surface area in the range 50 to 150 $m^2$/g. The transition aluminas contain less than 0.5 mole of water per mole of $Al_2O_3$, the actual amount of water depending on the temperature to which they have been heated.

Preferably, the alumina material is a gamma alumina or a theta alumina, more preferably a theta alumina, having a BET surface area of 90-120 $m^2$/g and a pore volume of 0.4-0.8 $cm^3$/g.

If desired, the porosity or other properties of the shaped units such as the BET surface area, attrition resistance or crush strength may be altered by a physical or chemical treatment. For example the shaped units may be calcined to temperatures >900° C. or treated with organic or inorganic compounds.

The support material is combined with the cobalt ammine carbonate solution. In one embodiment, the support in the form of shaped units, e.g. extrudates, pellets or granules is immersed in a solution of the cobalt ammine carbonate. In contrast to the prior art methods disclosed for extrudates in the aforementioned U.S. Pat. No. 5,874,281, in the present method the immersion of the shaped units is not prolonged to saturate the pores of the support and the excess cobalt ammine carbonate solution is not subsequently separated. Rather in the present method, the solution containing the shaped units is heated to 60-120° C., to decompose the cobalt ammine carbonate and form cobalt compounds on the surface of the support. To ensure that the shaped units are not damaged, the solution is preferably not agitated. Agitation is undesirable in the present method because it can damage the support units, leading to the undesirable formation of fines that could reduce filterability of the resulting catalyst in use. By the term "agitated" we mean that the solution is not stirred or mixed with sufficient shear force to disperse the shaped units throughout the solution or cause significant breakage the support units. In contrast to agitation, it may be desirable to gently turn the shaped units in the solution to expose their surfaces to the solution during the heating. Heating the solution decomposes the cobalt ammine carbonate by evolving ammonia and carbon dioxide. By removing ammonia, the pH of the solution is lowered and less soluble cobalt compounds precipitate from solution onto the support material. The precipitated cobalt compounds may comprise cobalt hydroxide, cobalt carbonate and/or cobalt hydroxycarbonate compounds. In the present invention, it is possible that some of the cobalt compounds may precipitate from solution in an unsupported state. This is undesirable and the precipitation conditions are desirably adjusted to minimise this possibility. Conditions that may be varied include cobalt concentration, heating rate, especially heating rate during decomposition of the cobalt ammine carbonate, final precipitation temperature and the initial and final solution pH. Preferably, the heating rate of the solution during the precipitation of the cobalt compounds is less than 0.4° C./minute. The unsupported cobalt compounds are typically in the form of very small particles (<0.5 mm in size). Preferably ≦10% wt of the cobalt compound is unsupported.

The catalyst precursor comprising supported cobalt compounds is preferably recovered from the solution once substantially all the cobalt in the solution has been precipitated. Recovery may be by filtration or decantation.

The recovered catalyst precursor may then be dried. The drying step may be performed at 20-150° C., preferably 20-120° C., more preferably 95-110° C., in air or under an inert gas such as nitrogen, or in a vacuum oven for a period as required up to 24 hours. If necessary, the dried catalyst precursor may be sieved to remove any unsupported cobalt compounds.

If desired, the dried catalyst precursors may be calcined, i.e. heated at temperatures above 250° C., for example 250-500° C. to convert at least a portion of the cobalt compounds to cobalt oxide. However in the method of the present invention calcination is not required to provide active catalysts with high cobalt surface areas. The ability to omit a calcination step is advantageous over prior art methods.

The thickness of the cobalt-containing layer in the catalyst precursors prepared by the method of the present invention is preferably between 5 and 250 microns, more preferably 5 to 150 microns. Beneath this layer it is desired that the cobalt concentration rapidly diminishes towards zero. The thickness of the cobalt-containing layer may be determined by methods known to those skilled in the art. For example optical microscopy in the present case is useful for measuring the thickness of the black cobalt compounds in the surface of the white oxidic supports. Alternatively electron microprobe analysis may be used for determining the thickness of cobalt layers in eggshell catalysts.

The dried or calcined catalyst precursor may then be provided to the hydrogenation or hydrocarbon synthesis reactor and reduced to generate active cobalt catalyst in-situ. Alternatively, the catalyst may preferably be provided in 'pre-reduced' form, where the dried or calcined catalyst precursor is subjected to a reduction step so that at least part of the cobalt is transformed into the elemental 'zero-valent' state.

Thus a reduction step may be performed by passing a hydrogen-containing gas such as hydrogen, synthesis gas or a mixture of hydrogen with nitrogen, methane or other inert gas over the dried catalyst precursor at elevated temperature, for example by passing the hydrogen-containing gas over the composition at temperatures in the range 200-600° C., preferably 200-500° C., more preferably 300-500° C. for between 1 and 24 hours at atmospheric or higher pressures up to about 25 bar.

In the catalysts prepared by the method of the present invention preferably at least 70%, more preferably >80% and most preferably >90% of the cobalt is reducible to the elemental active form. Catalysts with very high dispersions, expressed as cobalt surface area per gram cobalt in the reduced or activated catalyst may be obtained by the method of the present invention. Preferably the cobalt surface area of the catalysts is greater than 30 m$^2$/g cobalt, preferably greater than 50 m$^2$/g, especially greater than 60 m$^2$/g.

Cobalt surface areas may conveniently be determined by hydrogen chemisorption. The preferred method is as follows;

An accurately known weight of sample material (approx 0.2-0.5 g) is firstly degassed and dried by heating to 140° C. at 1° C./min in flowing helium and holding it at 140° C. for 60 min. The degassed and dried sample is then heated from 140° C. to 425° C. at a rate of 3° C./min under a 50 ml/min flow of hydrogen and then holding it under the same hydrogen flow, at 425° C. for 6 hours. Following heating under hydrogen, and under vacuum, the sample is heated up to 450° C. at 1° C./min and held under these conditions for 2 hours. The sample is then cooled to 150° C. and held for a further 30 minutes under vacuum. The chemisorption analysis is carried out at 150° C. using pure (100%) hydrogen gas. An automatic analysis program is used to measure a full isotherm over the range 100 mmHg up to 760 mmHg pressure of hydrogen. The analysis is carried out twice; the first measures the "total" hydrogen uptake (i.e. includes chemisorbed hydrogen and physisorbed hydrogen) and immediately following the first analysis the sample is put under vacuum (<5 mm Hg) for 30 min. The analysis is then repeated to measure the physisorbed uptake. A linear regression may then be applied to the "total" uptake data with extrapolation back to zero pressure to calculate the volume of gas chemisorbed (V).

Cobalt surface areas were calculated in all cases using the following equation;

$$\text{Co surface area} = (6.023 \times 10^{23} \times V \times SF \times A)/22414,$$

where V=uptake of $H_2$ in ml/g,
SF=Stoichiometry factor (assumed 2 for $H_2$ chemisorption on Co)
A=area occupied by one atom of cobalt (assumed 0.0662 nm$^2$).

This equation is described in the Operators Manual for the Micromeretics ASAP 2010 Chemi System V 2.01, Appendix C, Part No. 201-42808-01, October 1996.

The catalyst may in addition to cobalt, further comprise one or more suitable additives and/or promoters useful in hydrogenation reactions and/or Fischer-Tropsch catalysis. For example, the catalysts may comprise one or more additives that alter the physical properties and/or promoters that effect the reducibility or activity or selectivity of the catalysts. Suitable additives are selected from compounds of molybdenum (Mo), nickel (Ni), copper (Cu), iron (Fe), manganese (Mn), titanium (Ti), zirconium (Zr), lanthanum (La), cerium (Ce), chromium (Cr), magnesium (Mg) or zinc (Zn). Suitable promoters include rhodium (Rh), iridium (Ir), ruthenium (Ru), rhenium (Re), platinum (Pt) and palladium (Pd). Preferably one or more promoters selected from Ru, Re, Pt or Pd is included in the catalyst precursor. Additives and/or promoters may be incorporated into the catalysts by use of suitable compounds such as acids, e.g. perrhenic acid, metal salts, e.g. metal nitrates or metal acetates, or suitable metal-organic compounds, such as metal alkoxides or metal acetylacetonates. The amount of promoter metal may be varied between 3 and 50%, preferably between 5 and 20% by weight on total Co.

If desired, suitable compounds of additives and/or promoters may be added in suitable amounts to the solution of the cobalt ammine carbonate. Alternatively, they may be combined with the catalyst precursor before or after drying.

Cobalt catalysts having cobalt in the elemental or zero-valent state can be difficult to handle as they can react spontaneously with oxygen in air, which can lead to undesirable self-heating and loss of activity. Consequently cobalt catalysts suitable for hydrogenation reactions may be passivated following the reduction step with carefully controlled small amounts of an oxygen-containing gas, often air or oxygen in carbon dioxide and/or nitrogen. Passivation provides a thin protective layer sufficient to prevent undesirable reaction with air, but which is readily removed once the catalyst has been installed in a hydrogenation process by treatment with a hydrogen-containing gas. For catalysts suitable for Fischer-Tropsch processes, passivation is not preferred and the cobalt catalyst is preferably protected by encapsulation of the catalyst particles with a suitable barrier coating. In the case of a Fischer-Tropsch catalyst, this may suitably be a FT-hydrocarbon wax.

The catalysts may be used for hydrogenation reactions and for the Fischer-Tropsch synthesis of hydrocarbons.

Typical hydrogenation reactions include the hydrogenation of aldehydes and nitriles to alcohols and amines respectively, and the hydrogenation of cyclic aromatic compounds or unsaturated hydrocarbons. The catalysts of the present invention are particularly suitable for the hydrogenation of unsaturated organic compounds particularly oils, fats, fatty acids and fatty acid derivatives like nitriles. Such hydrogenation processes are typically performed in a continuous or batch-wise manner by treating the compound to be hydrogenated with a hydrogen-containing gas under pressure in an autoclave at ambient or elevated temperature in the presence of the cobalt-catalyst, for example the hydrogenation may be carried out with hydrogen at 80-250° C. and a pressure in the range $0.1$-$5.0 \times 10^6$ Pa.

The Fischer-Tropsch synthesis of hydrocarbons is well established. The Fischer-Tropsch process converts a mixture of carbon monoxide and hydrogen to hydrocarbons. The mixture of carbon monoxide and hydrogen is typically a synthesis gas having a hydrogen: carbon monoxide ratio in the range 1.7-2.5:1. The reaction may be performed in a continuous or batch process using one or more stirred slurry-phase reactors, bubble-column reactors, loop reactors or fluidised bed reactors. The process may be operated at pressures in the range 0.1-10 Mpa and temperatures in the range 150-350° C. The gas-hourly-space velocity (GHSV) for continuous operation is in the range 100-25000 $hr^{-1}$. The catalysts of the present invention are of particular utility because of their high cobalt surface areas/g catalyst.

The invention will now be further described by reference to the following examples and FIG. 1, which is an optical micrograph of a catalyst precursor prepared according to the method of Example 2(a).

EXAMPLE 1

Preparation of Cobalt Hexammine Carbonate Solution

Ammonium carbonate chip (198 g), ex Brotherton Speciality Products Limited (30-34 w/w % $NH_3$), was weighed into a 5 liter round bottomed flask. Demineralised water (1877 ml) and ammonia solution (~30%) (1918 ml), BDH 'Analar' Sp.Gr. 0.89 were then added and the mixture stirred until all the ammonium carbonate chip had dissolved. Cobalt basic carbonate (218 g), ex Shepherd Widnes Ltd. (45-47 w/w % Co), was added, with continual stirring, in approximately 25 g aliquots and allowed to dissolve. Slow addition is used to prevent any heat build up during the dissolution of the cobalt carbonate powder. The final solution was stirred continually overnight to ensure all the cobalt basic carbonate had dissolved before being filtered to remove any traces of insoluble particulate matter.

Further solutions were prepared varying the quantity of cobalt carbonate added. Some undissolved cobalt carbonate was retained on the filter paper after filtration when larger quantities of cobalt carbonate were used.

| Example | Actual Solution Cobalt Content (% wt) |
|---|---|
| 1(a) | 2.9 |
| 1(b) | 2.9 |
| 1(c) | 1.3 |
| 1(d) | 6.0 |
| 1(e) | 5.3 |

EXAMPLE 2

Coating of Supports

The catalyst support used was Theta $Al_2O_3$ trilobal extrudates, which before use were calcined in air at 1050° C. for 2 hours. The trilobes were 1.2 mm across and had a length between about 4 mm and 8 mm. The properties of the calcined support are given below;

| | BET surface area ($m^2/g$) | Pore Volume ($cm^3/g$) | Average Pore Diameter (Angstrom) |
|---|---|---|---|
| Theta $Al_2O_3$ 1.2 mm trilobes | 100.7 | 0.52 | 208 |

The cobalt hexammine solution was transferred into a round-bottomed flask situated in an isomantle. The solution was gently stirred and the required weight of alumina extrudates gradually added. The system was closed and heat applied. Distillation of the ammonia began as the temperature increased beyond 70° C. In all cases the preparation mixture changed colour from mid purple to black as distillation progressed. The temperature, pH and stirrer speed were monitored throughout the preparation. The stirrer speed was kept to the minimum possible without reflux occurring to prevent breakage of the extrudates. When the temperature reached above 100° C. and the pH was below 7.9 deposition of the cobalt was deemed to be complete. The catalyst precursor was filtered then washed with approximately 2 liter of demineralised water. The filter cake was finally dried at 105-110° C.

overnight (~16 hours). The catalyst precursor was separated from unsupported cobalt compounds by sieving through a 1 mm sieve. The catalyst precursor samples all appeared black in colour. Visual inspection of individual extrudates confirmed that an eggshell catalyst precursor had been prepared. The details for each solution are given below;

| Example | Volume Cobalt Hexammine Solution (l) | Cobalt Concentration (g/l) | Quantity Alumina Extrudates (g) |
|---|---|---|---|
| 2(a) | 4 | 116 | 255.2 |
| 2(b) | 1.87 | 54.23 | 119.3 |
| 2(c) | 3.85 | 55.8 | 122.8 |
| 2(d) | 1.8 | 156.6 | 344.5 |
| 2(e) | 1.8 | 156.6 | 344.5 |

| Example | Heating Rate After start of Distillation (° C./min) | Final pH | Quantity Dried Extrudate (g) | Quantity Dried Unsupported Powder (g) | Quantity Dried Unsupported Powder (%) |
|---|---|---|---|---|---|
| 2(a) | 0.5 | 7.75 | 357.6 | 90.7 | 20.2 |
| 2(b) | 0.2 | 7.80 | 150.0 | 32.0 | 17.6 |
| 2(c) | 0.5 | 7.75 | 141.9 | 60.7 | 30.0 |
| 2(d) | 0.5 | 7.90 | 475.5 | 33.8 | 6.6 |
| 2(e) | 0.2 | 8.00 | 497.4 | 26.5 | 5.1 |

The results show that the efficiency of the method is improved when the cobalt content of the cobalt ammine carbonate solution is above 5% wt, because less unsupported cobalt is formed. Furthermore, slower heating after decomposition of the cobalt ammine carbonate has commenced (ca. 0.2° C./min) appears preferable to faster heating (ca. 0.5° C./min).

The thickness of the cobalt-containing layer in the catalyst precursor was investigated using optical microscopy and electron probe analysis. FIG. 1 is an optical micrograph of the cross-section of a trilobe theta alumina shaped unit (1) prepared according to the method of Example 2(a). The thickness of the black outer layer of cobalt compounds (2) is about 120 microns. It can be seen that in the core (3) beneath the layer 2 essentially no cobalt is present. Electron probe analysis of the same material revealed a maximum cobalt concentration at a depth of about 8 microns. Electron probe analysis of Example 2(d) revealed a cobalt compound thickness of about 150 microns and a peak cobalt concentration at about 20 microns.

The dried catalyst precursors were reduced at 425° C. and the cobalt surface areas determined by hydrogen chemisorption at 150° C. according to the method described above. The results are as follows.

| Example | Co content wt % | Co Surface Area $m^2$/g catalyst | Co Surface Area, $m^2$/gCo |
|---|---|---|---|
| 2(a) | 12.9 | 7.2 | 46.9 |
| 2(b) | 14.4 | 5.7 | 35.6 |
| 2(c) | 7.4 | 4.5 | 56.0 |
| 2(d) | 16.3 | 9.8 | 52.3 |
| 2(e) | 14.8 | 10.7 | 62.2 |

The highest results were obtained for Co deposited from the higher cobalt content solution with the slower heating rate (2(e)).

EXAMPLE 3

Air and Peroxide Oxidation of Co(II)

Solutions of cobalt ammine carbonate were prepared as follows; Ammonium carbonate chip (198 g), was weighed into a 5 liter round bottomed flask. Demineralised water (1877 ml) and ammonia solution (~30%) (959 ml), BDH 'Analar' Sp.Gr. 0.89 were then added and the mixture stirred until the ammonium carbonate chip had dissolved. Cobalt basic carbonate (654 g), (45-47 w/w % Co), was added, with continual stirring, in approximately 25 g aliquots and allowed to dissolve. Slow addition was used to prevent any heat build up during the dissolution of the cobalt carbonate powder. The resulting solution was stirred continually overnight. The solution was then split into two equal parts.

(a) The first part was mixed with 100 ml of 30% $H_2O_2$ (BDH) at room temperature, then filtered using Buchner apparatus to removed any remaining solids. The pH of the solution prior to peroxide addition was 12.00 (Oxidation/Reduction Potential=−290 mV) and after addition was pH=11.78 (Oxidation/Reduction Potential=−100 mV)

(b) The second part was allowed to stand under an air atmosphere at room temperature for 12 days then filtered using Buchner apparatus to remove any remaining solids.

(c) For comparison, a comparable 2-liter solution was made without an extended air oxidation or addition of oxidising agent, stirred overnight, filtered and used immediately.

Following the method of Example 2, supported cobalt compounds were prepared by precipitating them from the three solutions onto the pre-calcined theta alumina trilobal support. Visual inspection of individual extrudates confirmed that in each case an eggshell catalyst had been prepared.

| Example | Cobalt in Hexammine Solution g/l | Cobalt Hexammine Solution pH | Volume of Soln. (ml) | Wt. Support Used (g) |
|---|---|---|---|---|
| 3 (a) | 43.4 | 11.80 | 1900 | 363.7 |
| 3 (b) | 54.8 | 12.15 | 1750 | 335.0 |
| 3 (c) | 55.6 | 12.20 | 1800 | 344.5 |

| Example | Heating Rate after Start of Distillation (° C./min) | Final pH | Colbalt in Catalyst (%) | Quantity Dried Extrudate (g) | Quantity Dried Unsupported Powder (g) | Quantity Dried Unsupported Powder (%) |
| --- | --- | --- | --- | --- | --- | --- |
| 3 (a) | 0.2 | 7.70 | 11.6 | 305 | 0.0 | 0 |
| 3 (b) | 0.2 | 7.77 | 13.1 | 397 | 8.0 | 2.0 |
| 3 (c) | 0.2 | 7.85 | 14.9 | 476 | 4.3 | 0.9 |

The dried catalyst precursors were reduced at 425° C. and the cobalt surface areas determined by hydrogen chemisorption at 150° C. according to the method described above. The results are as follows.

| Example | Co % wt | WLOR % wt | Co surface area m²/g catalyst | Co surface area m²/g Co |
| --- | --- | --- | --- | --- |
| 3 (a) | 11.6 | 10 | 6.2 | 48.1 |
| 3 (b) | 13.1 | 10 | 5.7 | 39.2 |
| 3 (c) | 14.9 | 15 | 10.4 | 59.3 |

WLOR = weight loss on reduction

The thickness of the cobalt-containing layer in the catalyst precursors were investigated using optical microscopy and electron probe analysis. The results indicate that in Examples 3(a) and 3(b) there is a sharp change in Co content at the edges, the thickness of the Co layers being in the region of 120 microns and 200 microns respectively. However for 3(c) the layer of Co compounds was thicker, indicating that more of the Co had penetrated into the extrudate. Thus, the addition of peroxide has reduced the amount of unsupported material and has improved the precipitation resulting in a better-defined eggshell coating of cobalt compounds.

The invention claimed is:

1. A method for the preparation of an eggshell catalyst precursor comprising the steps of:
   i) immersing shaped units of an oxidic support having a length from 0.5 mm to 50 mm, and a cross sectional width from 0.5 mm to 25 mm in an aqueous solution of cobalt ammine carbonate,
   ii) heating the solution containing the immersed shaped units at a heating rate of less than 0.4° C/minute to a temperature between 60 and 120° C. to precipitate cobalt compounds onto the surface of the shaped units,
   iii) separating the resulting supported cobalt compounds from the remaining solution, and
   iv) drying the supported cobalt compounds to form the eggshell catalyst precursor having a cobalt containing layer with a thickness between 5 and 250 microns; wherein less than or equal to 10 wt. % of the cobalt compounds are precipitated in an unsupported state.

2. The method of claim 1, wherein the cobalt concentration of the cobalt ammine carbonate solution is greater than 5% wt.

3. The method of claim 1, wherein the oxidic support comprises silica, titania, or alumina.

4. The method of claim 1, wherein the oxidic support is gamma alumina or theta alumina.

5. The method of claim 1, wherein the shaped units are pellets or extrudates with a cross-section that is circular, lobed, or fluted.

6. The method of claim 1, wherein an oxidising agent is added to the solution of cobalt ammine carbonate to oxidise the Co(II) to Co(III), prior to heating the solution to precipitate the cobalt compounds.

7. The method of claim 1, wherein the dried catalyst precursor is sieved to remove any unsupported cobalt compounds.

8. The method of claim 1, wherein the dried supported cobalt compounds are heated at elevated temperatures to convert at least a portion of the cobalt compounds to cobalt oxide.

9. The method of claim 1, wherein the dried supported cobalt compounds are heated under reducing conditions so that at least part of the cobalt is converted to its elemental form.

10. The method of claim 1, wherein the cobalt compounds are reduced by passing a hydrogen-containing gas over the catalyst precursor at a temperature in the range 200-600° C. for between 1 and 24 hours at atmospheric or higher pressures up to 25 bar.

11. The method of claim 9, wherein the reduced catalyst precursor is subsequently passivated with an oxygen containing gas or encapsulated with a barrier coating.

12. The method of claim 1, wherein the cross sectional width is a diameter.

* * * * *